United States Patent [19]

Sakai et al.

[11] 4,418,562
[45] Dec. 6, 1983

[54] CONTROL DEVICE FOR A SMALL PRESS

[75] Inventors: Yasuharu Sakai; Nobuaki Murai; Kiyotaka Nakano, all of Kyoto, Japan

[73] Assignee: Japan Storage Battery Company Ltd., Kyoto, Japan

[21] Appl. No.: 352,982

[22] Filed: Feb. 26, 1982

[30] Foreign Application Priority Data

Mar. 2, 1981 [JP] Japan ................... 56-30097

[51] Int. Cl.³ ............................. B21B 45/02
[52] U.S. Cl. ............................. 72/444; 72/452; 72/19; 72/26; 72/30; 318/626; 318/470; 318/484; 361/31; 192/129 A; 83/58; 83/62; 100/292; 100/48
[58] Field of Search ............ 72/19, 26, 30, 410, 72/452, 1, 444; 29/243.56, 243.57; 318/626, 470, 484; 361/31; 83/58, 62; 74/17.5; 192/129 A, 150; 100/48, 292

[56] References Cited

U.S. PATENT DOCUMENTS

| 2,208,058 | 7/1940 | Smith ................... 140/55 |
| 2,846,633 | 8/1958 | Gingrich ............... 361/31 |
| 3,520,391 | 7/1970 | Graham et al. ........ 318/470 |
| 3,617,837 | 11/1970 | Beck et al. ............ 318/470 |
| 3,878,521 | 4/1975 | Licitis et al. .......... 318/626 |

FOREIGN PATENT DOCUMENTS 269873 11/1950 Switzerland ................... 72/452

Primary Examiner—Francis S. Husar
Assistant Examiner—David B. Jones
Attorney, Agent, or Firm—Sughrue, Mion, Zinn, Macpeak & Seas

[57] ABSTRACT

A control device for a small press is provided with means preventing overloading of the drive motor, a timer for detecting when an operational cycle of the press has exceeded a normal value, and a position detector which notes the position of a cam of the press. The power switch of the drive motor is tripped to suspend the flow of current to the motor upon an indication of the foregoing, e.g., a detected over-current, an excessive cycle time, or an operation end position of the cam.

8 Claims, 1 Drawing Figure

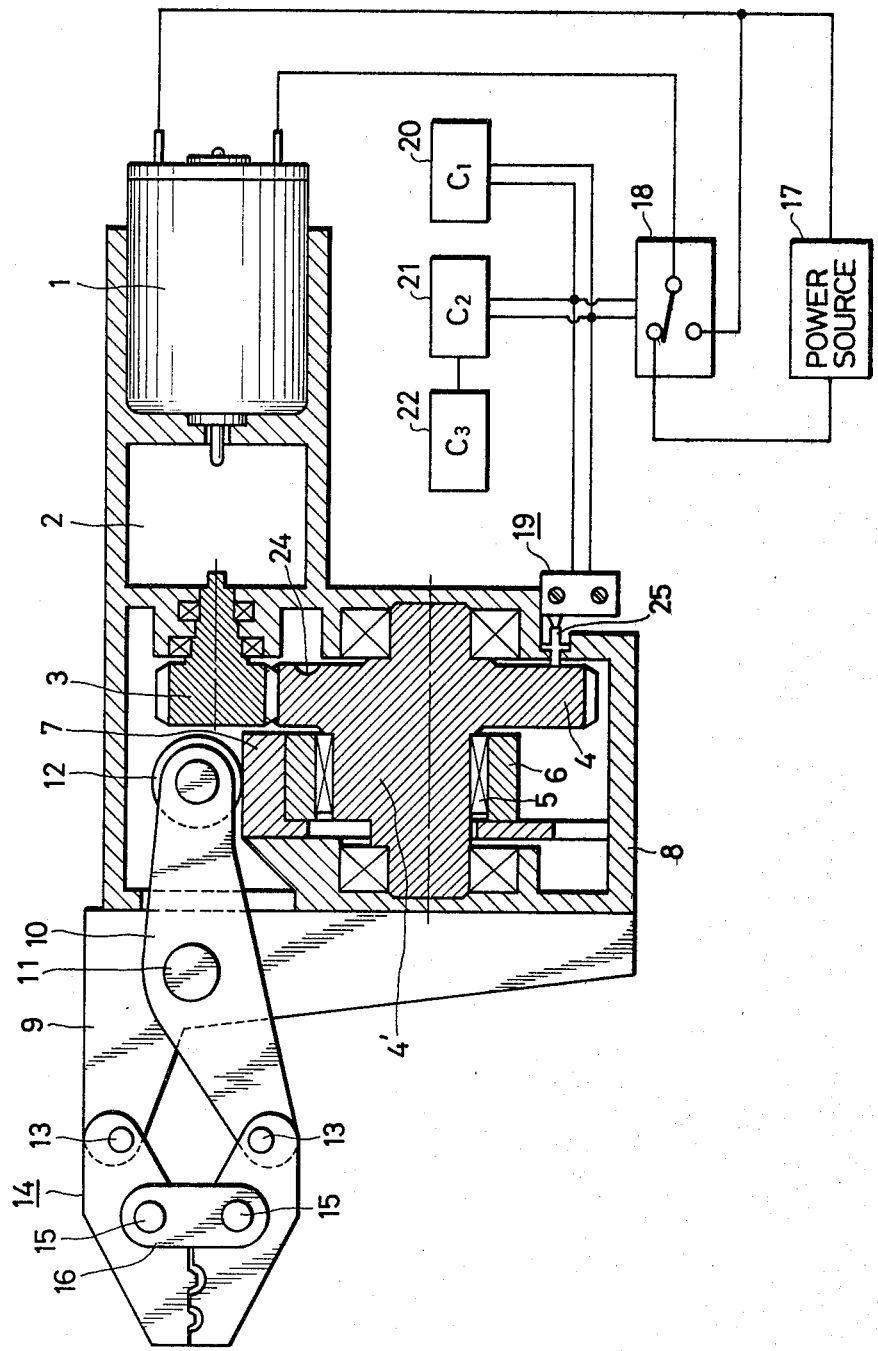

CONTROL DEVICE FOR A SMALL PRESS

BACKGROUND OF THE INVENTION

This invention relates to a control device for a small press for driving a pressing or cutting die assembly such as a die assembly for attaching terminals to lead wires under pressure, cutting rods or electric wires or caulking rivets.

Heretofore, a handy and strong power transmitting means for a small pressing or cutting press has not been available.

SUMMARY OF THE INVENTION

The object of this invention are to provide a small, light, secure press which uses a very small electric motor as its drive source, and to provide a control mechanism for the same. Specifically, the invention intends to provide a small press in which a small electric motor is employed as the drive source, a reduction gear or the like is used to obtain suitable torque to thereby turn an eccentric cam, a rocking lever is rockably mounted on a fulcrum shaft extended from a stationary lever, the rear end portion of the rocking lever being formed into a power transmitting portion slidably in contact with the cam so that the rotation of the cam is converted into the rocking of the lever to open and close a pressing or cutting die assembly, thereby to cause the engaging portions of the latter to press or cut an item to be processed, wherein:

(a) an overcurrent detector is provided which, even if a large current flows during the short period in which a start current flows until the motor is started after the power switch of the motor is turned on, does not turn off the power switch, but after the start current decreases, detects as an overcurrent a current which is larger than a predetermined value and due to an increase of torque of the motor, which is caused when an abnormally large load is applied to the small press, whereby the power switch may be turned off when the small press is overloaded, (b) a position detector provided on or near the cam is operated when the cam achieves one complete eccentric rotation, thereby to turn off the power switch of the motor, (c) in order to stop the operation of the press when the speed of the motor is decreased, for instance because the electric power source becomes abnormal, or the motor malfunctions, it is detected when the time required for one operating cycle of the cam exceeds a predetermined value, so that the power switch of the motor may be operated to interrupt the current, and where (d) the end of one complete cycle of operation of the cam is detected so that the power switch of the motor is operated to interrupt the current and simultaneously short-circuit the motor, to thereby quickly brake the motor.

One embodiment of the invention will be described with reference to the accompanying drawing.

BRIEF DESCRIPTION OF THE DRAWING

The single FIGURE in the accompanying drawing is a sectional view illustrating one embodiment of this invention.

DETAILED DESCRIPTION OF THE PREFERRED EMBODIMENTS

As shown in the single FIGURE of the accompanying drawing, the output shaft of an electric motor 1 is coupled through a reduction gear 2 to a pinion 3 which is engaged with a power transmission gear 4. While the speed of the motor 1 is reduced by a suitable gear reduction ratio by the reduction gear 2, the torque of the motor 1 is transmitted through the reduction gear 2 and the pinion 3 to the power transmission gear 4. The power transmission gear 4 is provided with an eccentric cylinderical cam 4' on the side thereof opposite the side on which the motor 1 is provided. Therefore, the cam 4' is turned eccentrically as the motor 1 rotates. A slide ring 6 is rotatably journaled by the eccentric cylindrical cam 4' with a bearing member 5 interposed therebetween. Reference numeral 7 designates a slide plate which reciprocates between top dead center and bottom dead center as the slide ring 6 on the eccentric cylindrical cam 4' turns eccentrically. The slide-plate 7 is of inverted-L-shape, and has an upper horizontal plate portion which is in contact with the slide ring 6, and a downwardly extended plate portion which has a vertically elongated through-hole at the central portion into which the rotary shaft of the power transmission gear is loosely fitted. Both side portions of the slide plate 7 are engaged with slide guides which are formed in the gear casing 8, and are inserted between the bearing of the power transmission gear 4 and the end face of the eccentric cylindrical cam 4'. Thus, the slide plate 7 is designed so that even if the contact position between the lower surface of the horizontal plate portion and the slide ring 6 is shifted horizontally as the cam turns eccentrically, the slide plate 7 is moved only linearly up and down while the horizontal plate portion is maintained horizontal.

A stationary lever 9 is fixedly secured to the front end of the gear casing 8, and has a fulcrum shaft 11 which extends perpendicularly to the shaft of the power transmission gear 4. A rocking lever 10 is rockably mounted on the fulcrum shaft 11. The rear end portion of the rocking lever 10 is formed as a power transmission portion, to which a contact roll 12 is coupled through a shaft in a manner such that the contact roll 12 is in contact with the slide plate 7. Therefore, as the slide plate is moved upwardly by the eccentric rotation of the cam 4', the contact roll 12 is also moved upwardly, and therefore the power transmitting portion of the rocking lever 10 is turned upwardly about the fulcrum shaft 11. In this operation, the contact roll is moved forthwardly or backwardly, while turning, by the amount of the horizontal displacement of the center of the contact roll which is caused by the turn of the rocking lever about the fulcrum shaft 11.

A pressing or cutting die assembly 14 is coupled through shafts 13 to the front end portions of the rocking lever 10 and the stationary lever 9. The die assembly comprises two die pieces with engaging portions. The die pieces are turned about die shafts 15 by the rocking motion of the rocking lever, so that the engaging portions are closed to press items inserted therebetween.

Further in the FIGURE, reference numeral 16 designates a die holding plate for holding the die pieces with the aid of the shafts 15; 17, a power source for energizing the motor 1; 18, a power switch which is operated to energize or deenergize the motor 1; 19, a position detector for detecting one revolution of the eccentric cylindrical cam 4'; 20, a time detector including a timer, which detects when one stroke cycle time of the cam 4' exceeds a predetermined value; 21, an over-current detector; and 22, a delay circuit. When an abnormally great reaction force due to the application of an abnormally large pressure is applied to the pressing die assembly 14, the torque of the motor is increased and an excessively large current flows in the motor 1 which may damage the latter. The over-current detector 21 is provided to prevent this problem; that is, it operates to detect when the current in the motor exceeds a predetermined value. The delay circuit 22 is provided to prevent the operation of the over-current detector which might otherwise occur due to a peak start-up current occurring immediately after the power switch of the motor is turned on; that is, the delay circuit 22 operates to stop the over-current detector 21 from operating for as long as the peak start-up current flows.

When the power switch 18 is turned on, the motor starts to rotate. The torque of the motor is transmitted to the cam so that the cam is turned eccentrically. The eccentric rotation of the cam is converted into the linear reciprocation of the slide plate, which is transmitted to the rocking lever to rock the latter, thereby to close the engaging portions of the pressing or cutting die assembly which are coupled through the shafts 13 to the front end portions of the rocking lever and the stationary lever.

If an abnormaly large reaction force is imparted to the die assembly, for instance when a material whose physical properties are over the rated capacity of the press is pressed by mistake, the motor is over-loaded, i.e., an over-current flows in the motor which could damage the latter. To prevent this problem, the over-current detector detects when the load current exceeds a predetermined value, to open the power switch. When the motor is first started, an excessively large start current, several times the rated current, flows because of the rest inertial force of the motor. If this start current is detected by the over-current detector 21, the power switch will be opened to stop the operation. In order to prevent this difficulty, the delay circuit 22 is connected to the over-current detector 21. That is, the delay circuit 22 operates to inhibit the over-current detection of the detector 21 for the period of time during which the start current flows, and thereafter allows the detector 21 to operate freely. When the electric power source supplying electric power to the motor becomes abnormal, decreasing the electric power, in general both the number of revolutions per minute and the torque of the motor are decreased. In this case, it either becomes impossible to transmit a sufficient operating power to the pressing or cutting die assembly, or the operating time is increased abnormally. In order to eliminate this difficulty, the time detector 20 is provided. More specifically, the time detector has a timer which starts immediately when the power switch is turned on, and detects when the rotation time period of the motor exceeds a predetermined value, to operate the power switch to thereby interrupt the motor current.

The small press of the invention should be halted after one cycle of operation of the pressing or cutting die assembly is accomplished. While the cam makes one revolution through the reduction gear, the pinion and the power transmission gear, the rocking lever swings once so that the die assembly accomplishes one operation, e.g. one complete cycle of operation. In order to detect this cycle of operation, a recess 24 is formed in the side of the power transmission gear opposite to the side where the cam is provided, which comprises an electrical switch to which a push rod 25 is coupled, so that the position detector 19 produces an operation cycle completion signal to operate the start switch 18 of the motor to interrupt the power source. The position detector may be arranged at the bottom dead center region so that it is operated by the eccentric rotation of the cam which is integral with the power transmission gear.

In the small press of the invention, it is desirable that, after one cycle of operation is ended, for the next cycle of operation to start with the maximum eccentric position of the cam at a position opposite to the position of the rocking lever. For this purpose, in the embodiment of the invention, the position detector 19 is operated to open the power switch 18 and simultaneously short-circuit the terminals of the motor so that the motor is electrically braked.

As was described above, in the small press of the invention, the current flowing in the motor is interrupted by the position detector which detects when one cycle of operation is accomplished. When the small press is over-loaded, or when the number of revolutions per minute or the torque of the motor are decreased, for instance because the supply voltage is decreased, as a result of which the time required for one cycle of operation is increased abnormally, the operation is stopped by the delay circuit and the over-current detecting circuit or the time detector, to protect the motor from damage or to prevent the movable components of the small press from being deformed. Furthermore, whenever one cycle of operation is achieved, the current applied to the motor is interrupted and simultaneously the terminals of the motor are short-circuited so that the motor is electrically braked, whereby the operation is stopped instantly. Thus, the small press of the invention is sufficiently protected from damage, and is excellent in work efficiency.

What is claimed is:

1. In a small press in which a rocking lever is rockably mounted on a fulcrum shaft extending from a stationary lever, and is rocked by a cam which is formed on a side of a power transmission gear driven by an electric motor, and in which a pressing or cutting die assembly is coupled through shafts to the front end portions of said rocking lever and said stationary lever, a control device comprising: position detecting means for detecting an operating cycle of said cam, over-current detecting means for detecting an abnormal load on said motor, delay means inhibiting said over-current detecting means during a time wherein a start current flows in said motor, and power switch means for said motor, said power switch means interrupting the flow of current to said motor in response to a signal from said position detector indicating completion of one operating cycle, or a signal from said over-current detecting means indicating an abnormal load on said motor.

2. A small press as claimed in claim 1, wherein said position detector comprises an electrical switch coupled to a push rod operated by a protrusion or a recess formed on a side of said power transmission gear.

3. A small press as claimed in claim 1, wherein said position detector comprises an electrical switch which is turned on and off by the eccentric motion of said cam.

4. In a small press in which a rocking lever is rockably mounted on a fulcrum shaft extending from a stationary lever, and is rocked by a cam which is formed on a side of a gear driven by an electric motor, and in which a pressing or cutting die assembly is coupled through shafts to the front end portions of said rocking lever and said stationary lever, a control device comprising:
   a power switch for said motor;
   a time detector for detecting when, after said power switch is turned on, a period of time required for one operation cycle of said cam exceeds a predetermined value;
   a signal from said time detector being applied, as a current interrupting signal, to said power switch.

5. In a small press in which a rocking lever is rockably mounted on a fulcrum shaft extending from a stationary lever, and is rocked by a cam which is formed on a side of a gear driven by an electric motor, and in which a pressing or cutting die assembly is coupled through shafts to the front end portions of said rocking lever and said stationary lever, a control device comprising:
   a power switch for said motor;
   a position detector for detecting when one cycle of operation of said cam is completed;
   a signal from said position detector being utilized to turn off the power switch of said motor and to short-circuit said motor.

6. A small press as claimed in claims 1 or 5, further comprising a time detector for detecting a time period of one operation cycle of said cam, and for triggering said power switch to interrupt the current to said motor when said time period exceeds a predetermined time.

7. A small press as claimed in claim 5, further comprising over-current protection means operable to turn off said power switch in the event of a motor overload occurring after a predetermined time after the application of current to said motor.

8. A small press as claimed in claim 7, further comprising timer means for turning off said power switch after a predetermined period of time, said time period being at least as great as a time normally required for a complete operation cycle of said cam.

* * * * *